Fig. 2

June 19, 1956  J. F. EARP ET AL  2,750,721
MACHINE FOR CHARGING AND CLOSING PAPER CONTAINERS
Filed Feb. 19, 1954  9 Sheets-Sheet 5

June 19, 1956   J. F. EARP ET AL   2,750,721
MACHINE FOR CHARGING AND CLOSING PAPER CONTAINERS
Filed Feb. 19, 1954   9 Sheets-Sheet 9

INVENTORS
James F. Earp
Clarence M. Clemens
Carlson, Pitzner, Hubbard & Wolfe
ATTORNEYS

United States Patent Office 2,750,721
Patented June 19, 1956

2,750,721

MACHINE FOR CHARGING AND CLOSING PAPER CONTAINERS

James F. Earp and Clarence M. Clemens, Detroit, Mich., assignors to Ex-Cell-O Corporation, Detroit, Mich., a corporation of Michigan Application February 19, 1954, Serial No. 411,306

12 Claims. (Cl. 53—67)

The present invention relates to machines for the fluid charging and closing of paper containers.

With the acceptance of the paper carton for the distribution of milk or other fluids, the problem of making this means of packaging economically available to smaller dairies has increased. It is desired to provide apparatus for small scale operations utilizing cartons already erected from the paper blanks at an economical cost without sacrificing the advantages of automatic filling and closing of such paper containers, and, of course, maitaining the high sanitary standards associated with such machines. Not only is it desired that such machines be of relatively low initial cost, but also that a minimum machinery outlay be required for processing containers of different sizes.

Accordingly, it is a primary object of the invention to provide a machine for economically fluid charging and closing paper containers.

It is also an object of the invention to provide a machine for automatically filling and closing already erected paper cartons. It is a further object to provide a novel means for automatically releasing a predetermined fluid charge into the container. It is another object of the invention to provide improved means for automatically stapling the filled cartons.

Another object of the invention is to provide an automatic machine of the nature described having improved means for conveying the paper carton to predetermined stations. It is a further object in this respect to provide a conveyor which is simply and conveniently alined. Still another object is to provide a conveyor assembly which is readily adapted for use with various sized containers.

Further objects and advantages of the invention will become apparent as the following description proceeds taken in connection with the accompanying drawings, in which:

General

While the invention is susceptible of various modifications and alternative constructions, a preferred embodiment has been shown in the drawings and will be herein described in some detail, but it is to be understood that there is no intention to limit the invention to the specific form disclosed, the intention being, on the contrary, to cover all modifications, alternative constructions, and equivalents falling within the spirit and scope of the invention as expressed in the appended claims.

Referring more specifically to the drawings, the invention is there exemplified in a filling machine 20 adapted in this instance to receive a quantity of milk to be discharged in measured amounts into paper containers or cartons of the gable-top type which are in turn filled, closed, stapled and finally sealed for retail distribution. The cartons 21 are of a known type made of waxed paperboard, and are supplied with an open mouth 22 (see Fig. 9) which is scored to define the various closure panels. One pair of sides 23 having rectangular scored panels are bent towards each other to cause the pair of other or tuck sides 24 to fold inwardly toward each other. The top flaps are respectively inserted and bent over to permit formation of a top rib 25 which (Fig. 10) is stapled and sealingly heated. Various size containers may be used according to the requirements of the particular run. The containers are preferably tapered so that they may be nested for convenient storage.

The machine 20 is organized upon a frame structure or table 26 with the drive assembly 27 comprising the main driving motor together with the timing and power transfer mechanisms mounted below the table top. Connected to the table is an upright support (Fig. 4) bearing a dispensing magazine 29 for a stack of nested cartons and a breaking mechanism 30 which preliminarily bends inwardly tuck sides 24 of the container mouth along the score lines thereon, but without leaving the container in a folded condition, to facilitate the folding and closing of the carton after it is filled. Each carton 21 after it has first been removed from the dispenser and broken in by the breaking mechanism is then ready to be placed in a carton basket 31 on the machine conveyor 32 which is located above the table top. The conveyor moves the carton baskets intermittently along one side of the table and back along the other in a predetermined path. Cartons from other sources than the associated magazine or breaker mechanisms may of course be employed or substituted as desired.

While such a machine may employ a greater or lesser number of conveyor pockets and conveyor dwell positions or stations, in the particular machine illustrated twelve conveyor dwell stations and twelve corresponding conveyor pockets are provided as exemplary of the capacity of a small machine embodying the present invention may be profitably incorporated. For convenience of reference, these twelve stations are indicated in the plan view of Fig. 3, starting with loading station *a* and proceeding clockwise to the twelfth and last position *l* where the ready-to-deliver containers are unloaded.

Outlining briefly the means mounted on the table 26 for processing the cartons and their order of operation, an empty carton is loaded into the conveyor basket at position *a* by the operator. A filling means 33 bridging the left end of the table as viewed from the operator's position (Fig. 2) provides half the total charge of milk or other liquid to the cartons at each of conveyor dwell positions *b* and *d*. The cartons are next closed in a closing guide means 34 positioned along the conveyor length including dwell positions *e*, *f*, and *g*. The closing guide means is particularly described and claimed in the copending application Serial No. 411,468, filed February 19, 1954, by John R. Wills and Clarence W. Jane and assigned to the assignee of the present invention.

After the conveyed carton is closed, a stapling machine 35 at position *h* staples the top rib 25 of the carton and the carton proceeds around the right hand end of the conveyor to dwell position *j* where it is finally heat sealed by the final sealing means 36. The cartons thus filled and completely closed and sealed are removed from the idle station *k* or *l* for distribution.

*Conveyor assembly*

To provide a suitable support for the conveyor, the table structure 26 on which the conveyor is mounted suitably takes the form of a steel beam framework 37 supported on the left hand (as viewed in Fig. 2) end by a single leg 38, and on the right hand end by two spaced legs 39. Over the top of the table and around the upper sides as a sanitary cover is a stainless steel sheet skirt 40. Spaced along the lengthwise axis of the table top are three support pads through which tubular supports 41, 42 and 43 respectively extend upwardly from the timed drive assembly below.

The conveyor 32 is supported on the three tubular supports. Rigid upper and lower stationary plates 44 and 45, suitably made of commensurate lengths of steel plate, are alined with the lengthwise axis of the table 26 and supportingly spaced from the table and each other by the tubular supports. Sprocket shafts 46 and 47 are journaled between the facing ends of the plates 44 and 45, each carrying top and bottom chain sprocket wheels 48. Upper and lower conveyor chains 49 are respectively stretched between the upper and lower sprocket wheels 48 to provide the conveyor movement. The right hand (Fig. 2) sprocket shaft 46 extends below the table surface for coupling to the intermittent conveyor drive, and the left hand (Fig. 2) sprocket shaft 47 is journaled in adjustable upper and lower journal blocks 50 on the facing left hand end surfaces of the conveyor top and bottom plates 44 and 45. As shown in the drawings, and particularly in Figs. 3 and 4, the blocks 50, while conventionally journaled, are provided with slotted bores 51 through which they are bolted to the conveyor plates, thus permitting axial adjustment of the blocks and of the conveyor chain tension. To facilitate the adjustment setting, a stop block 52 is fastened to both the upper and lower conveyor plates 44 and 45 adjacent the inner side of each journal block 50, i. e., on the side of each journal block toward the center of the table. Each stop block 52 is threaded to receive an axially directed stud 53 which enters the stop block from its inner side and is turned so that its end engages the adjacent journal block and forces it outwardly against the chain tension. Any suitable lock nut arrangement is provided. Guides or tracks for conveyed carton carrier assemblies mounted on the driven chains 49 are suitably provided by upper and lower side channels 54 and 55 in facing surfaces of the stationary conveyor plates.

These channels extend just below each stretch of the bottom chain and above each stretch of the upper chain, terminating near the regions where the chains 49 engage the sprockets 48. As shown in the drawings, the guides may be conveniently fabricated by securing four pairs of spaced vertically disposed rails or flanges 55 whose facing vertical surfaces define the tracks or channel walls, to the conveyor plates. More particularly the bottom rails are attached to the sides of integral shoulders 55 on the lower plate 45 and the top rails are provided in the form of side edge flanges of the upper plate 45 together with spaced rails welded to the plate.

To carry the cartons through the work stations spaced around the conveyor 32, the carriers 31 are pivotally connected to the upper and lower chain 49 and accurately guided and alined by the guide channels 54 and 55. Each carrier assembly includes a vertically disposed plate 56 having horizontal end flanges 57 and upper and lower brackets 58 along the vertical centerline. The brackets 58 are pinned to the upper and lower chains 49. Mounted on each corner of the upper flange 57 is an upper roller or wheel 59 on a vertical axis to slide in the upper guide channels 54. Similar lower rollers 60 are connected to the lower side of the bottom flanges to track in the lower guide 55. Thus the carrier plate 56 is guided in a true path parallel to the lengthwise axis of the conveyor as the chain drive intermittently pulls the several carrier plates along the guide rail length. When the plates reach the ends of one set of upper and lower guides near a sprocket wheel 48, the rollers leave the guide ways and the carrier rides around the sprocket wheel to engage the guides on the other side of the conveyor.

Figure 1:
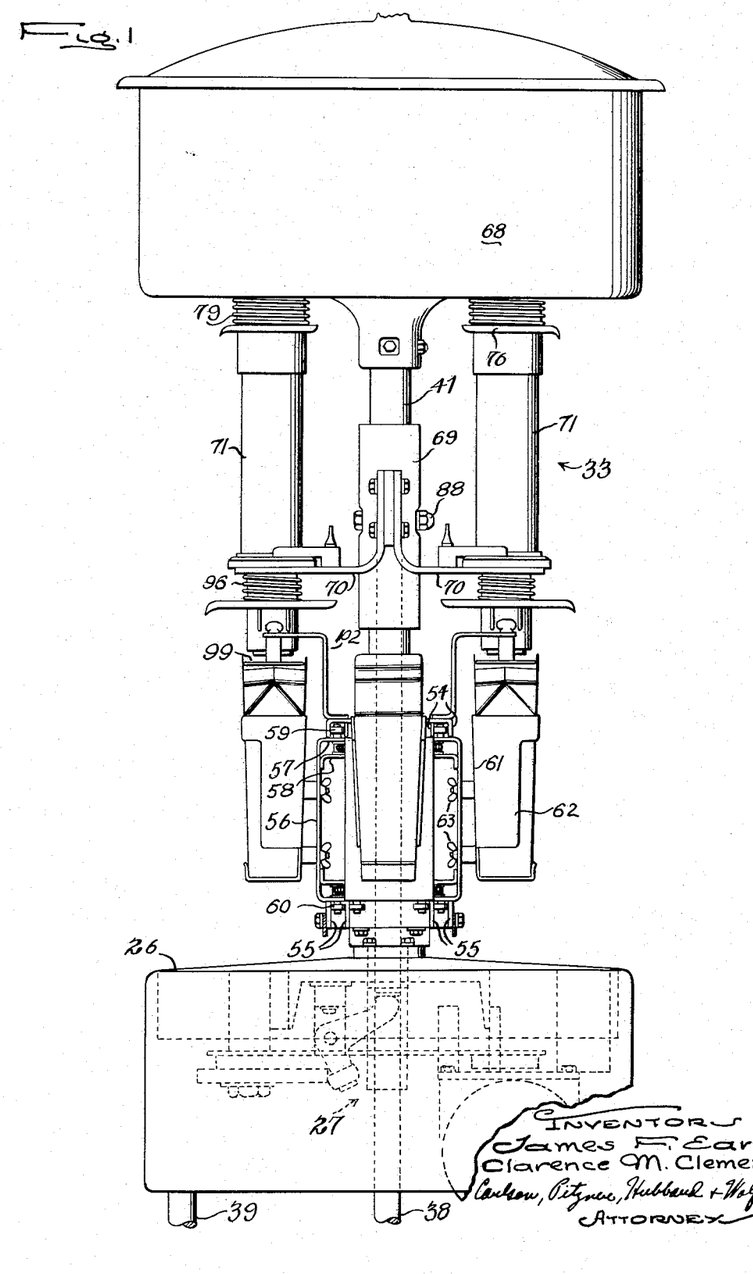
Figure 1 is an end elevation of a fluid charging and closing machine embodying the invention and particularly showing the charging end of the machine and its automatic actuating means.

The cartons are suitably carried upright in the sheet metal pocket or basket 31 having a vertical or near vertical back portion 61 against which a container 21 rests and a bent-over bottom having an upturned flange to support the carton and prevent it from slipping out of place. Side walls or wings 62 extending out from the back portion 61 help hold the cartons snugly in place. Each of the carrier basket back portions 61 is connected to one of the carrier plates such as in the manner shown in Figs. 1 and 2 wherein top and bottom bolts and wing nuts 63 are employed. For containers of different heights, the carrier bottom may be raised as by means of a spacing block or additional bottom insert. It will be appreciated that the cartons 21 are readily positioned in or removed from the baskets 31, and yet are firmly held in a definite position and elevation with respect to the conveyor for accurate positioning at each of the work stations.

Figure 2:
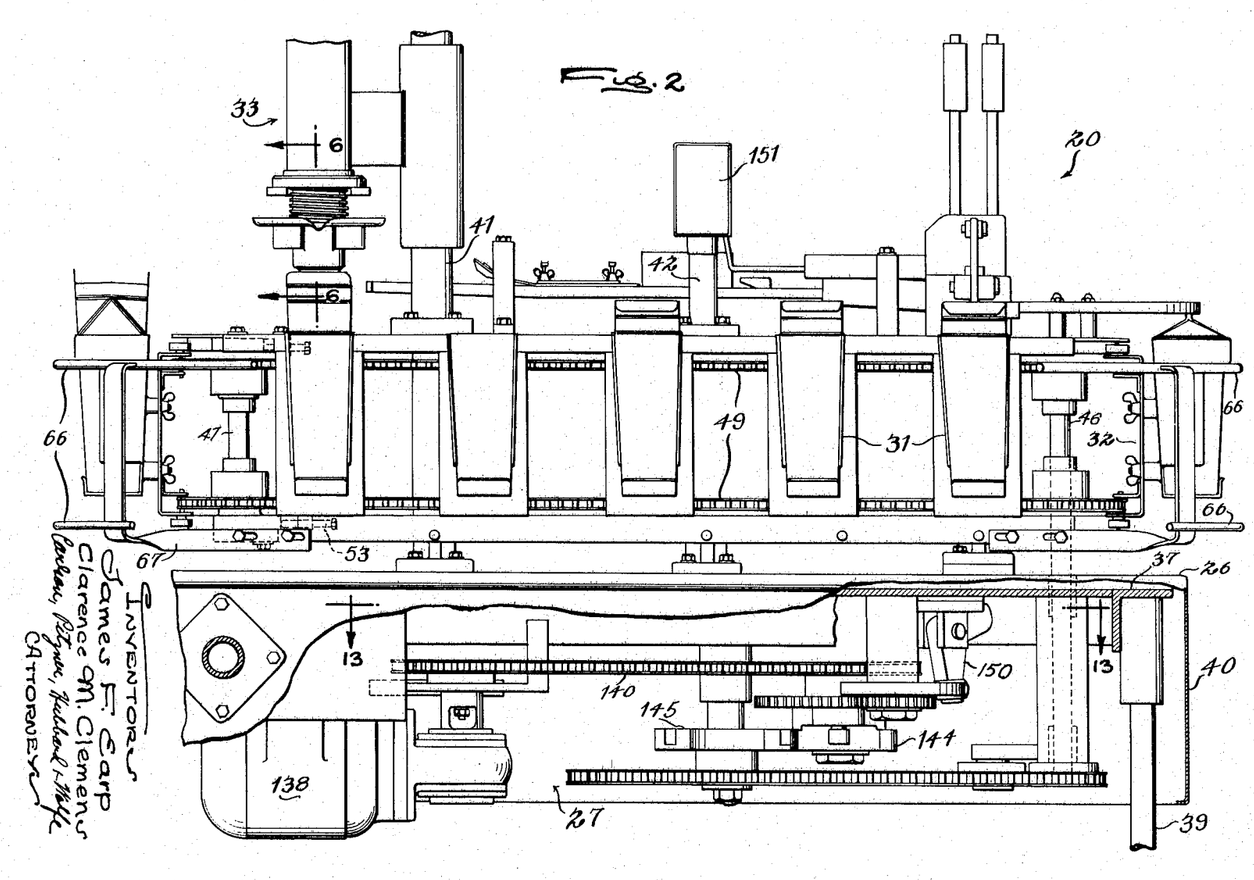
Fig. 2 is a longitudinal elevation of the machine in Fig. 1 showing various stations of the container conveying system and being partly in section to better illustrate the driving machinery.

To help stabilize each carrier and the open carton carried by it as it travels around the left hand sprocket wheel 48, the outer ends 64 of the slidable journal blocks 50 previously mentioned are smoothly curved to provide an inner bearing surface for the guide rollers 59 and 60, the surfaces being substantially an extension of the inner rails of each set of conveyor guides 54 and 55. At the right hand end of the conveyor an upper cover plate 65 spaced beyond the upper plate 44 of the conveyor is provided, being in substantially semicircular form and bearing down on the top ribs of the conveyed cartons engaging its lower surface. The cartons at this end of the conveyor are normally closed and stapled, and it is desirable to keep the top rib from springing up and out of position for the final sealing. Guard rails 66 are also provided at each conveyor end, the rails being suitably in the form of semicircular tubular members to resist any tendency of the cartons to be thrown out of their carrier baskets. The guard rail assemblies 66 are suitably supported by connecting straps 67 fastened to the ends of the lower conveyor plate 45.

Filling means

The filling means 33 on the left hand end of the table charges cartons at positions *b* and *d* on the opposite sides of the conveyor by a measured amount equal to half the desired total at each station. In the example illustrated, each half-gallon carton receives two one-quart charges, thus avoiding slowing of the conveyor speed for the filling of the larger size containers.

The fluid supply source is an overhead bowl or tank 68 having a fitted cover and is supported centrally over the left end of the conveyor on the upper end of the left-hand tubular conveyor support member 41.

Supported from a vertically slidable sleeve 69 on the tube 41 below the tank is a pair of measuring flask support brackets 70, one extending in each lateral direction to support a transfer or measuring flask 71 for both conveyor positions *b* and *d*. The flask may suitably take the form of a stainless steel cylinder having a one-quart capacity.

Figures 5, 6, 7:
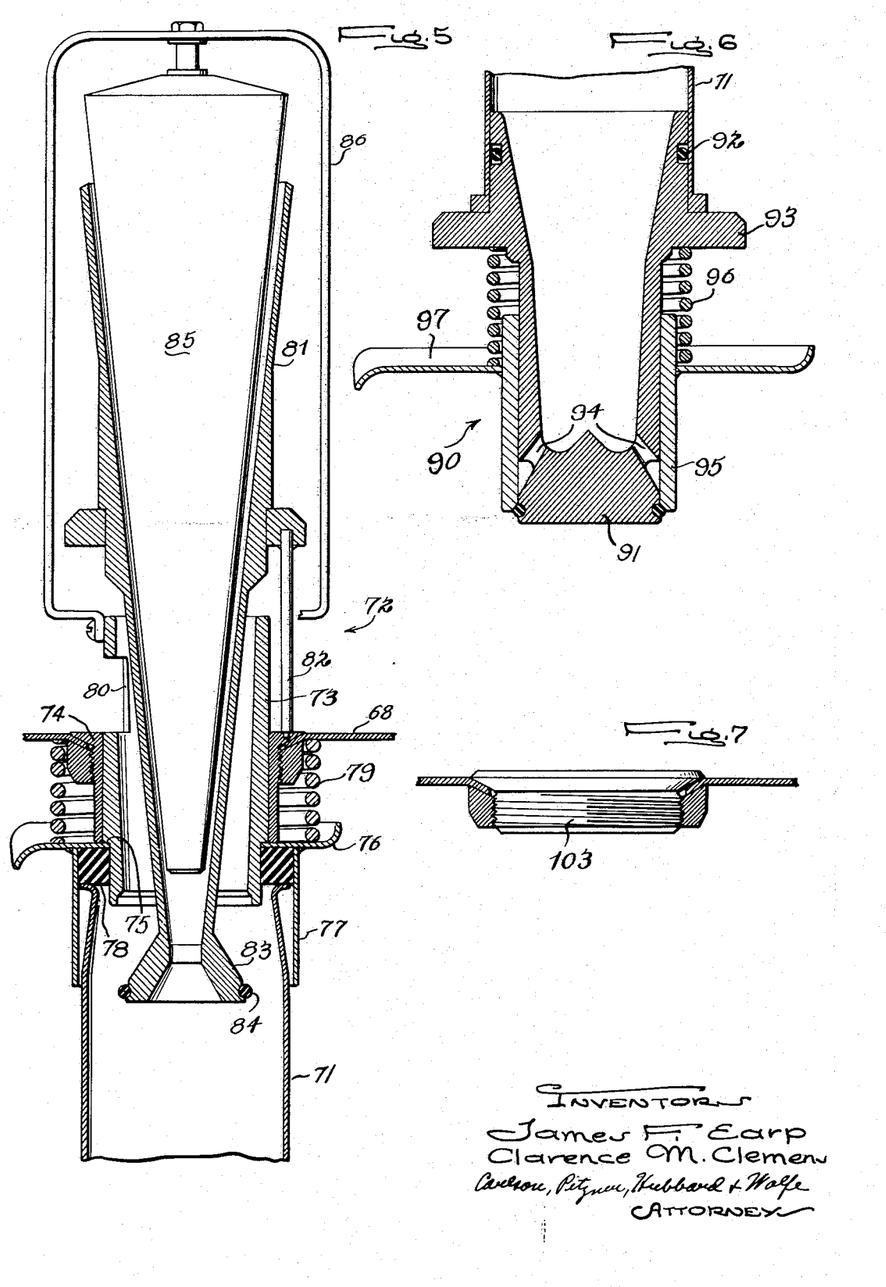
Fig. 5 is a vertical section through the measuring valve taken in the plane of line 5—5 of Fig. 3.
Fig. 6 is a vertical section of the dump valve taken in the plane of the line 6—6 of Fig. 2.
Fig. 7 is a detailed section showing one of the measuring valve openings plugged.
Figure 8:
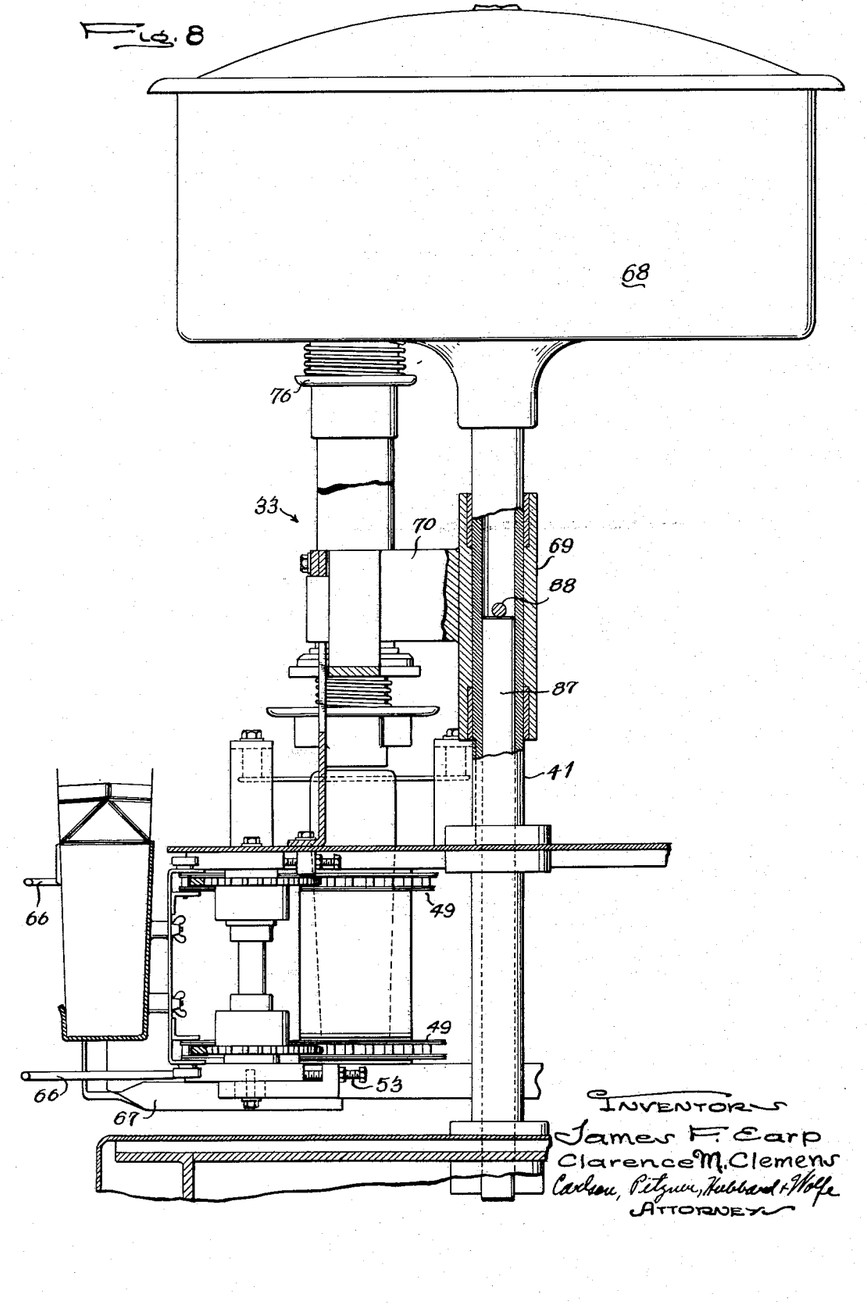
Fig. 8 is a view, partly in section, of the conveyor adjusting mechanism and the actuator of the valves taken in the plane of line 8—8 of Fig. 3.

Above the top of each flask 71 is a measuring valve opening in the bottom of the bowl for admitting the milk or other liquid into the flask. As shown in Fig. 5, each measuring valve 72 has a tubular piston 73 vertically slidable within a cylindrical flange member 74 held in an aperture in the bottom of the tank. An external shoulder 75 on the lower portion of the hollow plunger provides a seat for an annular drip tray 76 from which is dependently supported a cylindrical guide skirt 77. A resilient sealing washer 78 between the skirt and piston sealingly seats the upper end of the raised flask 71, and a compression spring 79 around the flange 74 between the bowl 68 and drip tray 76 moves the drip tray downward to thus permit descent of the piston 73 when the flask is lowered. Apertures or windows 80 are provided in the upper portion of the hollow piston 73 so that when a raised flask 71 moves the piston upward, liquid flows through the top and apertures of the piston to the flask below to fill it.

The valve action of the measuring valve 72 is provided by the coaction of the sliding piston 73 with a hollow stationary inner core 81 supported by rods 82 from the bowl 68. As may be seen, still referring to Fig. 5, the inner core 81 suitably takes the form of a downwardly tapering conical hollow plug having a flared lower end 83 extending through the bowl aperture, on which end is seated a rubber sealing ring 84. Thus when the piston 73 is biased downwardly by the spring 79 and not subjected to any upward valve operating pressure, its lower end seats on the O-ring and prevents the passage of fluid.

When the metering valve piston assembly is moved upward into the tank or bowl as in the position indicated on Fig. 5 by the raising of the flask 71 under it, the lower end of the piston 73 is no longer seated on the valve core end 83, permitting the liquid to flow through the piston and around the core end into the flask 71 below. As is desired to prevent foaming of milk, the liquid is directed against the walls of the container due to the direction the stream receives as it flows over the diverging end surface 83 of the valve core 81. The same valve action provides proper venting of the air in the container since the core 81 is hollow and has sufficient height to extend above the normal level of the liquid in the tank. To provide a more positive valve closing action a conical weight 85 movable vertically within the conical hollow of the valve core 81 has its upper end connected to the center of a U-shaped support member 86 whose bottom ends are fastened to the upper ends of the sliding piston or plunger 73. The added weight helps make a positive seat between the piston and the sealing ring when upward pressure is removed from the plunger assembly by lowering of the flask. The flask, when lowered, thus contains a predetermined liquid charge.

Both measuring valves 72 are simultaneously operated by the raising and lowering of the flask-bracket sleeve 69 on the tubular support 41 and the consequent raising or lowering of the tops of the flasks 71 within the measuring valve skirts 77. A timed cam actuated rod 87 within the tubular conveyor support 41 moves upward during the conveyor movement and downwardly again during the dwell periods to actuate the sleeve 69. For this purpose the sleeve 69 is in turn provided with a bolt 88 extending therethrough as a stop member for the cam shaft, the tubular support 41 being slotted vertically to permit the sleeve to be raised and lowered with the rise and fall of the cam actuated rod. Thus while containers are being moved into positions *b* and *d*, the measuring flasks are raised to open the measuring valves, and when the cartons dwell at the filling positions, the flasks are lowered, thus closing the measuring valves.

A dump valve 90 is provided at the lower end of each transfer flask 71 to release the charge of liquid when the valve is actuated by reason of its being lowered into contact with the carton. The operation of the valve may be readily understood by reference to Fig. 6. As may be seen, the lower end of each transfer container is fitted with a ported hollow cylindrical plug 91. The upper end of the hollow plug 91 is removably fitted within the lower end of the flask, a groove in the plug carrying a sealing ring 92 to complete the fluid seal and an external shoulder 93 on the plug limiting the entry of the plug into the flask. Near the lower end of the plug 91, a pair of opposing oblique bores or ports 94 are provided from the outer cylindrical surface upward to communicate with the interior of the flask. Preferably the cavity within the plug has two laterally spaced portions of maximum depth, each of which communicates with one of the oblique bores 94 so that when the ports are open, milk may flow smoothly out opposite sides of the plug.

The valve action of the dump valve 91 is provided by a valve sleeve 95 slidable over the lower end of the cylindrical plug 91 so as to cover the ports 94 except when the sleeve is raised. The sleeve 95 is biased in the closed position by a compression spring 96 positioned between an annular drip tray 97 secured to the sleeve and the lower surface of the plug shoulder 93. A liquid seal and limiting lower position of the valve sleeve 95 is provided by a rubber ring held in a groove on the lowermost end of the plug 93. Upon raising of the valve sleeve 95 relative to the plug 91 by a carton under the valve, milk from the transfer flask flows down and out against opposite inner sides of the container in the manner generally desired to prevent excess foaming of the liquid. The size or number of the ports is controlled, of course, to be consistent with the speed requirements of the filling operation.

Figures 9, 10, 11:
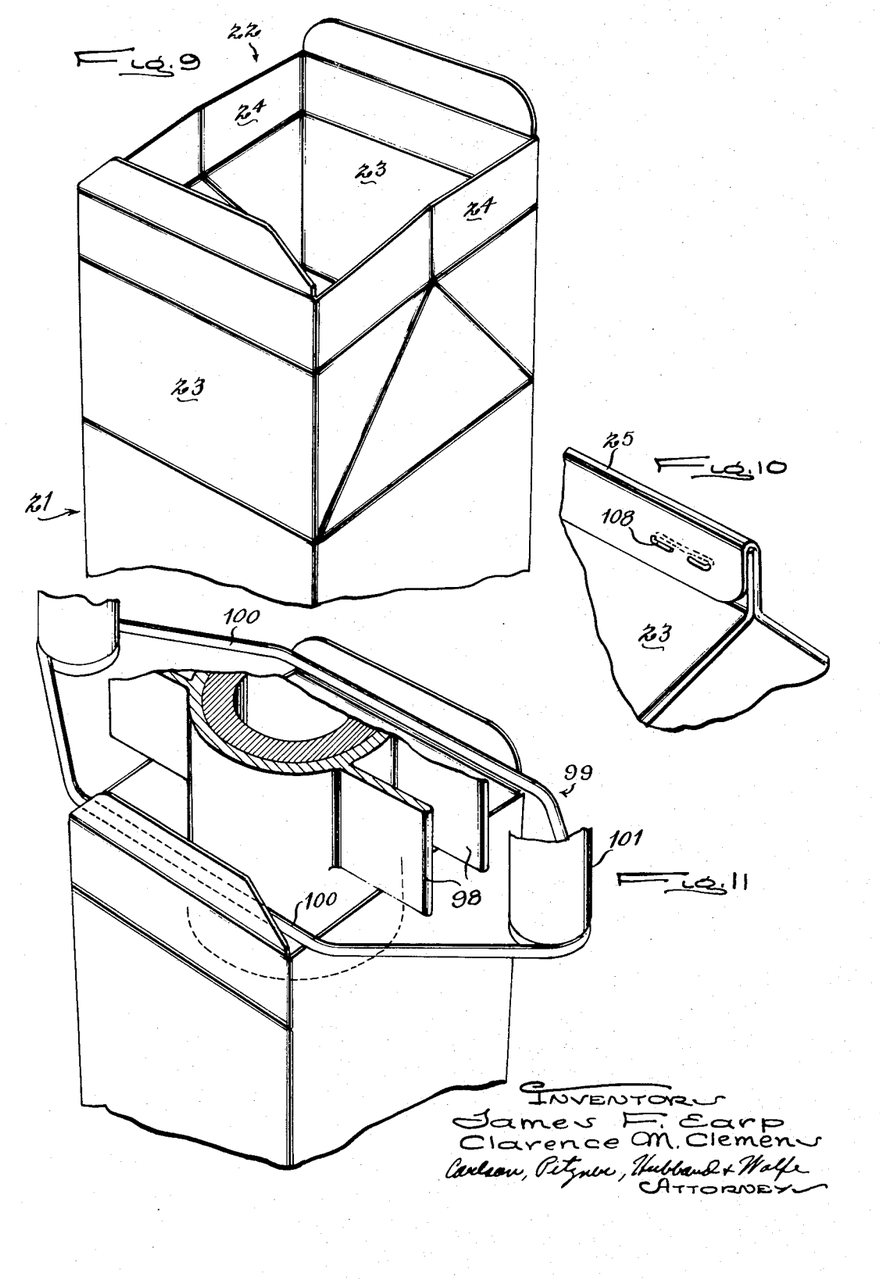
Fig. 9 is a fragmentary perspective of an unfilled paper container or carton of a type advantageously employed with the machine embodying the invention.
Fig. 10 is a fragmentary perspective of the carton of Fig. 9 after closing and stapling.
Fig. 11 is a fragmentary perspective of the dump valve of Fig. 6 shown in position to fill a carton together with the cooperating guide for holding the carton mouth open.

Means for opening the dumping valve 90 is conveniently provided through the use of laterally projecting dogs or wings 98 which are suitably welded to the valve sleeve below the drip tray 97. It will be understood, of course, that while the wings or stops may take a variety of forms, spaced pairs of such wings being here shown (Fig. 11) extending from each side of the valve sleeve 95 in a direction parallel with the conveyor path. Accordingly, recalling again the form of the gable top carton as shown in Fig. 9, it will be seen that the scored sides 24 stop the descent of the valve dogs 98 when the dump valve 90 is lowered with the flask upon a carton at either of the filling positions, thus causing the sleeve to uncover the valve ports 94. Due to the presence of the container itself, the dump valve is therefore actuated and the amount of flow is the metered amount within the transfer container. After the flasks have discharged their loads, the camming action of the rod 87 again lifts the flask assemblies, closing the dump valves and again opening the metering valves.

Figure 4:
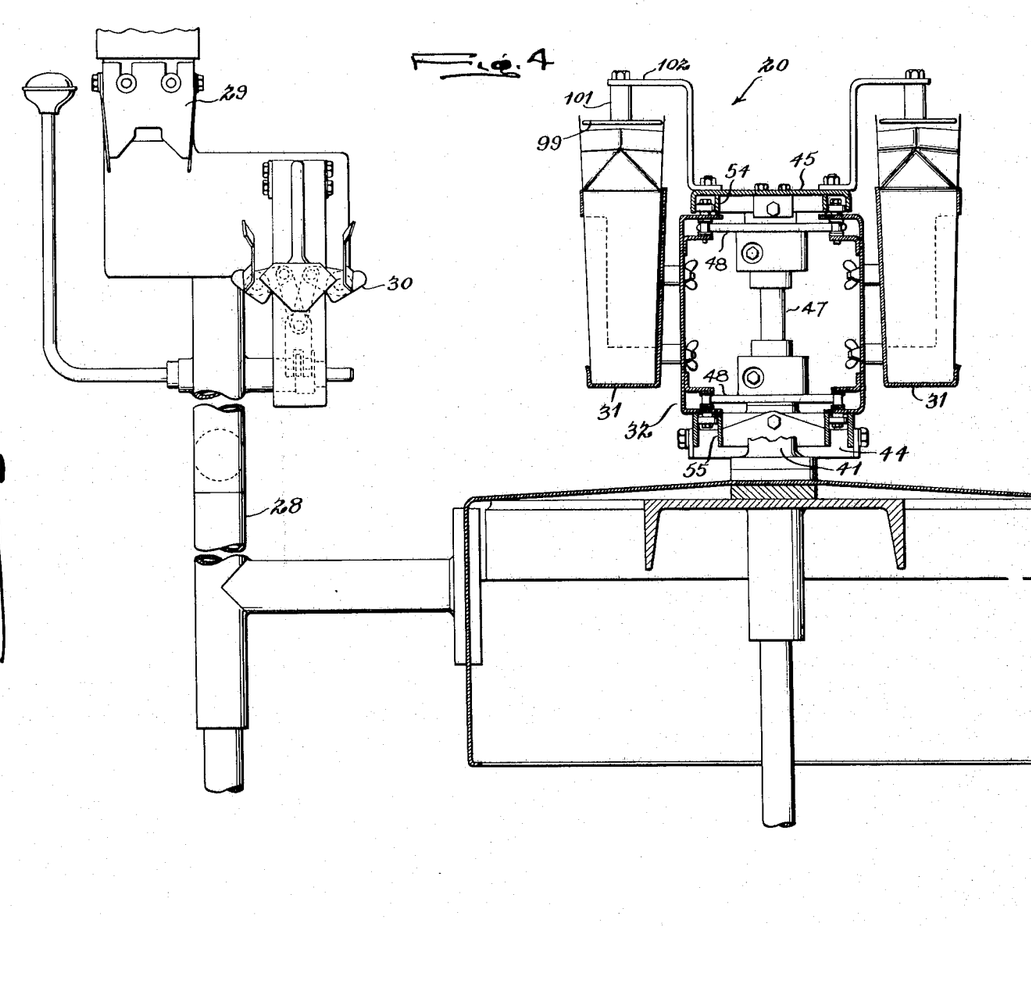
Fig. 4 is a vertical section taken in the plane of the line 4—4 of Fig. 3, particularly showing the container supply magazine and preliminary folding mechanism, and also illustrating the conveyor slides.

In the carton mouth 22 as shown by Fig. 9, one pair of opposite carton sides 24 is relied upon for resisting the dump valve sleeve stops 98, the other pair of sides 23 having upstanding tabs or flaps which should remain upright to prevent them from impeding the operation of the dump valve 90 as well as to maintain them in the proper position for the subsequent closing or folding operations. Accordingly, as shown in Fig. 11, a stationary spreader assembly 99 is employed to keep the carton mouth open. This may suitably take the form of a closed wire loop having a pair of parallel sides 100 alined with the direction of conveyor travel and spaced far enough apart to bear against the inner surfaces of the carton flaps if the carton sides 23 on their flaps tend to fold inwardly. The leading end of the loop converges from the parallel sides to spread the flaps apart if necessary as the conveyed cartons approach the filling positions. The trailing end may be suitably similarly shaped, the loop being supported at both its leading and trailing ends by a pair of spaced vertical support rods 101 suitably carried by support straps 102 mounted on the upper conveyor plate 44 (Fig. 4). The dumping valve sleeve and projecting ends fit or descend within the stationary loop and are not contacted or otherwise subject to interference by it.

After a half-gallon carton has passed through each of the one-quart filling positions, the container is then ready to be closed. Of course, if one quart cartons are being filled, or in any cases where the flask capacity is the desired complete charge for a container, one of the flasks 71 is removed together with its associated metering valve 72, and the bowl aperture is closed by a plug 103 as shown in Fig. 7.

Closing means

The closing guide 34 is described in the related copending application mentioned in a prior paragraph, and to which reference may be had for a detailed description. Very briefly, it includes a main pair of stationary guide bars 105 and 106 which converge in the direction of conveyor travel to fold the carton sides 23 together and close the carton mouth. Additional cooperating guide plates are attached and bar 105 is divided to provide selective and sequential bending of the top flaps and formation of a top rib 25. Heating means, including a heater 107 positioned over the trailing portion of the guide bars just prior to the stapler, softens the wax coating on the top paper layers so that the carton is ready for stapling.

Stapling means

Figure 3:
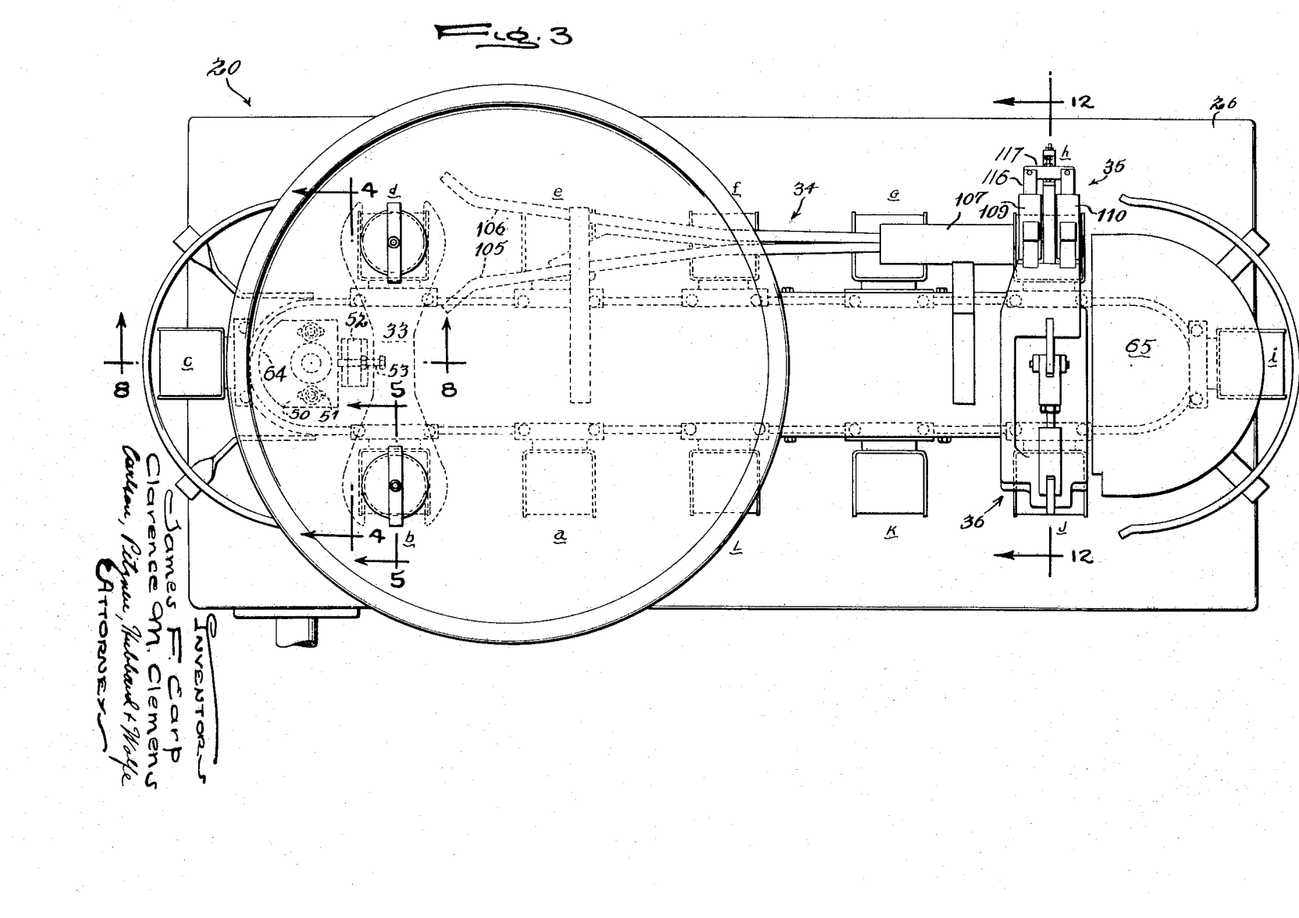
Fig. 3 is a plan view of the machine of Fig. 1, showing the various positions of the machine conveyor.

The filled and closed gable top containers advance to position h as shown in the particular conveyor arrangement of Fig. 3 where the stapling means 35 is employed in this case to drive two laterally spaced U-shaped wire staples 108 through the several thicknesses of paperboard of each container top rib 25 (Fig. 10). Two similar staplers 109 and 110 positioned side-by-side are accordingly employed.

Figure 12:
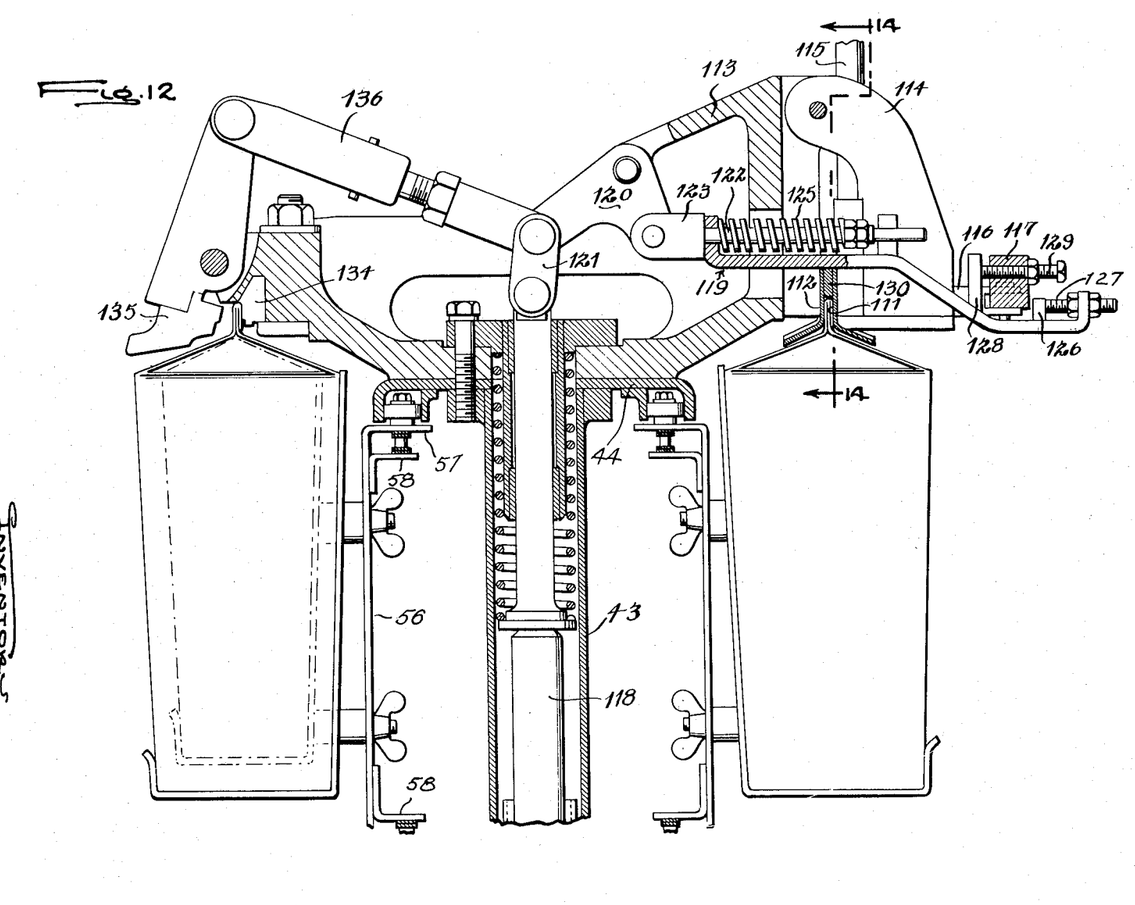
Fig. 12 is a vertical section through the stapling and sealing stations of the machine taken in the plane of line 12—12 of Fig. 3.

The upstanding rib on a conveyed carton to be stapled remains during the dwell period of position h between the hammer 111 and anvil 112 of each stapler unit. As shown in Fig. 12, the anvil frame 113 is rigidly attached to the upper conveyor plate 44 with the anvils 112 at the lower portion of the anvil assembly to contact the carton rib. Hinged to an upper portion of the anvil assembly are the hammer frames 114 which hang down on the other side of the carton rib. Upright staple magazines 115 extend upwardly through each hammer assembly. A horizontal hammer slide 116 is positioned in the lower end of each hammer assembly and is conventionally arranged when forced inwardly to engage the foremost staple in the magazine and force the staple through the container rib 25 to clinch its ends against the anvil 112 on the other side. A transverse connecting bar 117 is pivotally connected to the slide ends for operation of the staplers substantially as a single unit.

In order to actuate the staplers during the period that a conveyor holder dwells in the stapling position, a power transfer linkage with the timed vertical displacement of a cammed rod 118 within the right hand conveyor support tubing 43 is utilized. As shown in Fig. 12, the upward movement of the cammed rod is translated to horizontal movement of a stapler actuator member 119. This is suitably accomplished by means of a bell crank 120 centrally pivoted to the stationary anvil frame 113 and having one end pivoted to a link 121 moved by the upper end of the cammed shaft 118 and having the other end pivotally coupled to the stapler actuator 119. The pivotally supported operating arm 119 is thus drawn by reason of its connection to the bell crank 120 toward the conveyor by the bell crank when the cam shaft is lifted.

Figures 14, 15:
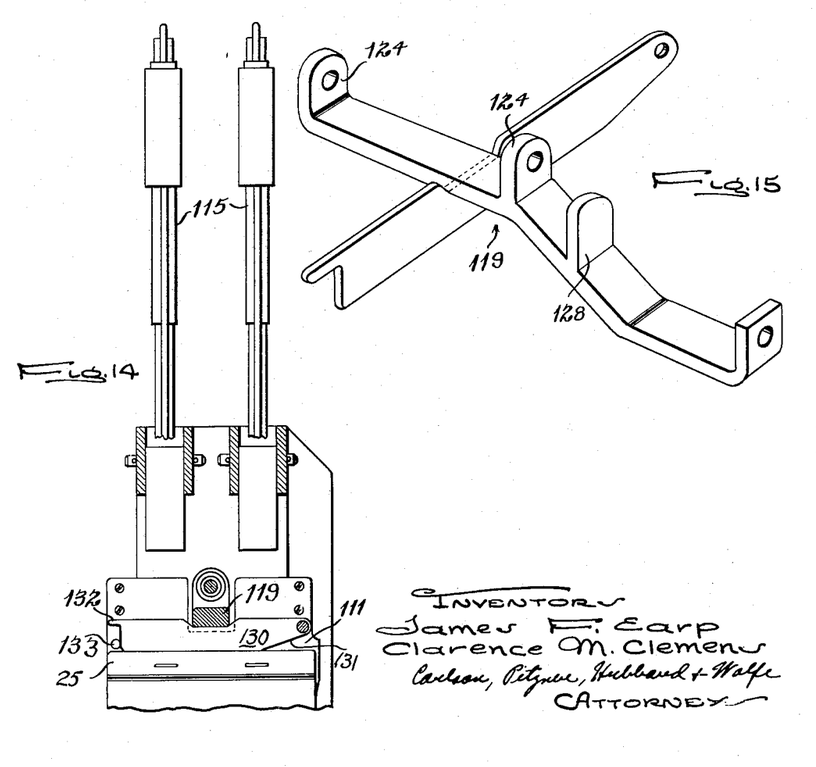
Fig. 14 is a fragmentary vertical section of the stapling means taken in the plane of the line 14—14 of Fig. 12 showing the feeler guide in position.
Fig. 15 is a perspective of the stapler actuating member.

In the example illustrated (Figs. 12, 14 and 15), the actuating arm 119 extends between the two stapler assemblies transversely of the conveyor axis. While the member 119 may be directly pivoted to the horizontally swingable end of the bell crank, and it is preferably yieldingly connected thereto by a pin 122 with a clevis head 123. The clevis head is pivoted to the crank and the pin slides through a pair of upstanding lugs 124 spaced along the pivoted end of the actuator member 119. An adjustable compression spring 125 surrounds that portion of the pin between the lugs so that any lost motion is taken up by the spring force at the desired magnitude. Near the outer end of the operating arm 119 an upstanding stop block 126 is provided, this block preferably being adjustable along the end length of the arm by means of an adjusting stud 127 fastened thereto and threaded through the upturned end of the member. When the end of the pivoted arm is held high enough, the stop 126 engages the transverse bar 117 connecting the ends of the stapler hammer slides. Then when the stapler operating member arm moves inwardly, it forces the hammer slides inwardly to compress and staple the carton rib between the stapler hammer and anvil. An intermediate return stop 128 on the operating arm 119 bears against the other side of the transverse stapler bar 117 to push the stapler hammer slides back at the end of the stapling cycle in preparation for the next carton. A threaded stud 129 passing through the bar provides an effective stop adjustment. In the particular embodiment illustrated, the outer end of the operating arm 119 bearing the stops 126 and 128, while held generally horizontally in the engaging position, is at a lower level than the pivoted inner end of the bar. This is accommodated by a bend in the bar, but it is to be understood of course that the configuration varies to meet the particular requirements of various stapler installations.

Needless operation of the staplers when there is no carton in the conveyor carrier is avoided because in the absence of support from a carton top, the pivoted stapler arm 119 drops out of operating position. Rather than support the arm 119 directly by the top rib of a carton, the tapered or rounded end of a feeler strap is preferably pivoted to the anvil assembly of the first or leading stapler 109 to lift the arm 119 overlying it when a carton top rib engages the tapered end of the feeler and raises it to a horizontal position. When the arm 119 is accordingly lifted thereby to the horizontal actuating position shown in Fig. 12, its stops engage the stapler hammer slide bar 117 as previously discussed. An upper finger 132 on the trailing end of the feeler 130 engages a lower anvil pin 133 when no carton is present to limit the arm drop out to the amplitude needed.

Final sealing means

After stapling, the stapled cartons are carried around the drive sprocket to the final sealing means 36 at the conveyor station j just oppositely disposed across the conveyor from the stapling station h. A vise assembly is provided with an inner stationary jaw 134 against which the top rib 25 of the carton slides as it is conveyed into position, and a heated pivoted jaw lever 135 is arranged to be tightly clamped against the carton rib, thus heating the wax throughout the several waxed paperboard layers and pressing the layers together. The hermetic seal for the carton is thus completed. The timed clamping action is provided by a toggle connection between the same cam-operated rod 118 operating the stapler means, an adjustable link 136 being pivoted between the upper end of the pivoted jaw 135 and the other end being pivotally connected along with the stapler bell crank to the cam shaft connecting link 121. After the sealing jaws are released and the conveyor moves the sealed carton to the final idle positions, the carton is ready to be removed for distribution.

Drive assembly

Figure 13:
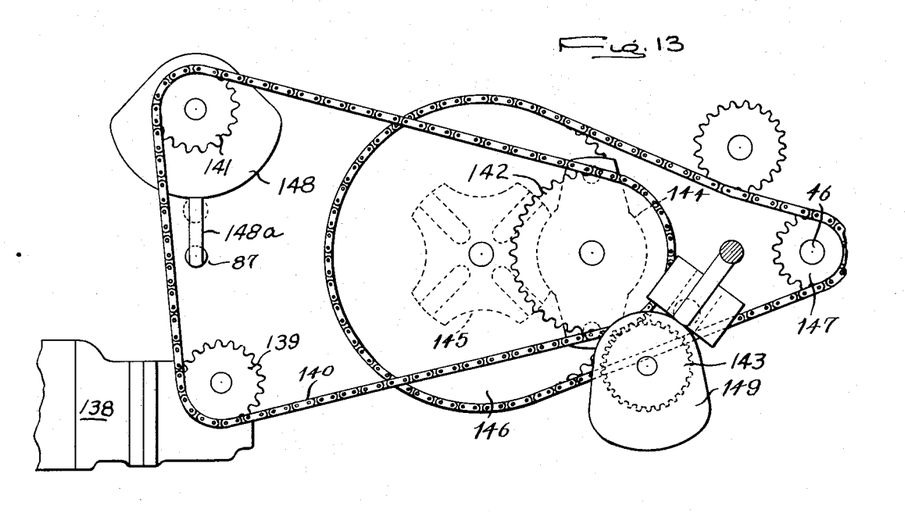
Fig. 13 is a fragmentary horizontal section of the machine drive taken in the plane of the line 13—13 of Fig. 2.

The drive assembly for the conveyor and timed power transfer system for the filling, stapling, and final sealing means is shown most clearly in Fig. 13. As illustrated, a single drive motor 138 is advantageously employed having a reduced speed drive sprocket wheel 139 coupled by a chain belt 140 to a filling cam sprocket wheel 141, a conveyor sprocket wheel 142, and a stapling and sealing cam sprocket wheel 143.

The intermittent conveyor drive provided to advance the conveyed cartons from station to station and permit them to remain long enough at each station so that the station function can be performed is suitably affected by a conventional Geneva movement in which the Geneva drive wheel 144 is fastened to the driven conveyor sprocket wheel 142 and has a pair of diametrically opposite drive rollers and a central locking hub. The driven member 145 of the Geneva movement may suitably take the form of a wheel having four radial slots located 90° apart and having a concave curvature between the adjacent slots. An intermittent or indexing motion is imparted to a drive sprocket 146 fixed to the driven Geneva member 145 which in turn is chain-coupled to the sprocket wheel 147 on the end of the conveyor drive shaft 46 extending below the table surface.

To actuate the filling mechanism cam rod or shaft 87, housed in the support tube 41, the filling cam 148 has a lobe or large radius portion of substantial angular extent, in this case approximately 180°, and tapers gradually to the small radius portion. The large radius section bears against the end of a bell crank 148 to move the other end of the rocker arm and elevate the cam shaft 87 and its associated transfer flasks above the table during the entire period the conveyed cartons are being moved between stations. As previously mentioned, this movement actuates the metering valve 72 and, upon lowering, places the dump valves 90 in position to operate. The stapling and sealing control cam 149 actuating the cammed rod 118 in the support tube 43 bears against a bell crank 150 to actuate the stapler and sealer as previously described.

It will be noted that the two end conveyor support tubes 41 and 43 thus also carry the timed actuating rods from below the table top. The center tubular support 42 is also doubly employed being used to carry the motor and heater electric lines to a switch box 151 mounted on it.

Synopsis of operation

Since the operation of each of the various mechanisms included within the machine has been discussed, a further description of the operation seems unnecessary at this point. However, in summarizing, it may be seen that the formed cartons, preferably removed from an associated magazine of nested cartons and with the folding sides broken in to facilitate later automatic folding, are loaded into the empty conveyor carriers ahead of the first filling station, and the conveyor is intermittently advanced through the various stages of the conveyor. The loaded carton is thus first partially charged at the first filling station, the fluid from the measuring transfer flask being automatically dumped into the carton by reason of the resistance of the edges of the carton to the descent of the dump valve assemlby and the carton is at the same time kept in an open position to permit the entry of the dump valve by the spreader guide fixed at each filling station. At the second filling station the second and completing charge is provided. The carton is next folded to assume the familiar gable top shape and guided to the stapling position where the presence of a properly folded carton at that station automatically sets up the stapler operating arm for completion of the stapling operation during the dwell period there. The carton is next conveyed to the sealing station where the top folds are heated and compressed to complete the seal and the filled carton is then ready for removal and delivery.

It may be seen that the arrangement of the operating stations with respect to the conveyor structure simplifies the machine construction. Thus the conveyor chain tension is readily adjusted and the two sides of the endless belt conveyor provide a true path for the cartons in the conveyor carriers. The disposition of the filling stations at opposite sides of one end of the conveyor and the similar disposition of the stapling station and the sealing station at the opposite sides at the other end of the conveyor simplies the power transfer mechanism required for automatic timed operation in synchronism with the intermittent conveyor drive. At the same time, since the filling and stapling stations do not operate unless a carton is properly in position the possibility of waste is avoided and small or partial loads can be readily employed as is especially consistent with the needs of a small lot machine.

We claim as our invention:

1. A machine for liquid filling and closing of paper cartons comprising a conveyor having elognated horizontal upper and lower support members, first and second upright tubular supports supportingly spacing said support members, means for conveying a plurality of carton carriers from station to station around said support members, a liquid reservoir supported over one end of said conveyor by said first upright tubular support, a transfer flask assembly over conveyor stations on both sides of said end of said conveyor slidably supported by said one of said tubular supports and coupled to a first actuating rod within the said one tubular support, stapling and sealing mechanisms supported on the upper horizontal support member over conveyor stations on both sides of the other end of said conveyor, said mechanisms coupled to a second actuating rod within said second upright tubular support, and a timed power drive system for intermittently advancing said conveyor and moving said rods within said first and second tubular supports.

2. A machine for liquid filling and closing of paper carton comprising a conveyor having elongated horizontal upper and lower support members, upright tubular supports supportingly spacing said members, means for intermittently conveying a plurality of carton carriers from station to station around said support members, a liquid reservoir supported over one end of said conveyor by one of said upright tubular supports, a pair of transfer flasks over conveyor stations on either side of said end of said conveyor slidably supported on said one of said tubular supports by an actuating rod within the said one tubular support, first valve assemblies in the bottom of said reservoir operable by the elevation of the flasks thereto to fill the flasks thereof, second valve assemblies in the lower ends of the flasks operable by the lowering of the flasks on cartons in said conveyor stations, a power drive for intermittently advancing said conveyor, and transfer means synchronized with said power drive for raising and lowering said rod within said tubular support.

3. In a machine for liquid filling and closing of paper cartons, a conveyor having elongated horizontal upper and lower support members, upright tubular supports supportingly spacing said members, means for intermittently conveying a plurality of carton carriers from station to station around said support members, a liquid reservoir supported over one end of said conveyor by one of said upright tubular supports, a pair of transfer flask assemblies over conveyor stations on either side of said end of said conveyor slidably supported on said one of said tubular supports by an actuating rod within the said one tubular support, first valve assemblies in the bottom of said reservoir operable by the elevation of the flasks thereto to fill the flasks thereof, and second valve assemblies in the lower ends of the flasks operable by the lowering of the flasks on cartons in said conveyor stations.

4. A machine for filling and closing paper cartons comprising a conveyor having elongated horizontal upper and lower support members, first and second upright tubular supports supportingly spacing said members, means for conveying a plurality of carton carriers from station to station around said support members, stapling and sealing mechanisms supported on the upper horizontal support member over conveyor stations on respective sides of one end of said conveyor, said mechanisms coupled to an actuating rod within one of said upright tubular supports, a power drive system for intermittently advancing said conveyor, and a timed transfer means synchronized therewith to raise and lower said rod within said one tubular support.

5. In a machine for automatically filling upright paper containers having open mouth sides from a liquid reservoir, a drive means for intermittently advancing cartons to be filled to a station below said reservoir, an upright measuring flask positioned above the carton station, a first valve in the bottom of the reservoir above said flask, a second valve at the lower end of said flask, the housing of said second valve having actuating means responsive to upward pressure means for raising the flask to open said valve and fill the flask, and means for lowering said flask to close said first valve and to open said second valve upon engagement of the open mouth sides by said actuating means.

6. A machine for automatically filling paper cartons from a liquid reservoir comprising a horizontal conveyor having a plurality of spaced carton carriers fastened thereto, drive means for intermittently advancing said carriers to a given station along said conveyor and below said reservoir, a measuring flask fillable from said reservoir being positioned above said station, a release valve in the lower end of said flask having actuating means operable by the reaction of a carton mouth thereon to discharge said flask, and means for lowering said transfer flask after a carton carrier is in said given station to a level at which said actuating means is operable by a carton in said carrier.

7. In a machine for fluid filling an upright paper carton having an open mouth with a pair of upstanding flaps on one pair of opposite sides thereof, conveyor means for advancing a carton to a given station, spaced carton flap spreader bars positioned above said station for engaging the facing sides of said flaps and maintaining a minimum spacing between them, a transfer flask positioned above said spreader bars, a pressure-actuated release valve on the lower end of said flask, and means for lowering said flask between said spreader bars to bias said pressure-actuated valve against the top edges of another pair of opposite sides of the carton and open said valve.

8. In a machine for automatically fluid filling upright paper cartons having open mouths with upstanding flaps on one opposite pair of sides thereof, a conveyor having a plurality of spaced carton carriers thereon, drive means for intermittently advancing successive carriers to a given filling station along said conveyor, a pair of spaced spreader bars at said station alined with the tops of said cartons, said bars having converging leading ends with respect to the advancing direction of the conveyor for entering between the flaps of a carton advanced to a said station and maintaining a minimum spacing therebetween, a transfer flask alined above said work station, a fluid reservoir positioned above said flask, a measuring valve in the bottom of said reservoir actuatable by upward pressure applied thereto, a discharge valve on the lower end of said transfer flask, projections thereon directed parallel to the carton flaps responsive to upward pressure to open the dump valve, means coupled to said intermittent drive means for raising the top of said flask against said measuring valve to fill said flask during the advance of said carriers and for lowering said flask between said spreader bars whereby in the presence of a carton at said station said projections engage the other opposite pair of carton mouth sides to empty the flask into the carton.

9. Means for fluid filling upright paper cartons having open mouths with upstanding flaps on one opposite pair of sides thereof, a conveyor having a plurality of spaced carton carriers thereon, drive means for intermittently advancing successive carriers to a given filling station along said conveyor, a pair of spaced spreader bars at said station alined with the tops of said cartons, said bars having converging leading ends with respect to the advancing direction of the conveyor for entering between the flaps of a carton advanced to a said station and maintaining a minimum spacing therebetween, a transfer flask alined above said work station, a fluid reservoir positioned above said flask, a filling valve in the bottom of said reservoir actuatable by upward pressure applied thereto, a dump valve on the lower end of said transfer flask, projections thereon directed parallel to the carton flaps responsive to upward pressure to open the dump valve, and means for raising the top of said flask against said filling valve to fill said flask and for lowering said flask between said spreader bars whereby said projections engage another opposite pair of carton mouth sides to discharge the flask.

10. In a machine for automatically filling and closing paper cartons with a top rib thereon, a horizontal conveyor having a plurality of spaced carton carriers fastened thereto, drive means for intermittently advancing said carriers to a stapling station along said conveyor, a stapling mechanism comprising a hammer and anvil disposed on opposite sides of the top rib location, an actuating arm pivoted at one end positioned across the conveyor path at said station, the free end of said arm being directly raised by the entry of the closed top of a carton at said station to engage said hammer assembly, and timed means coupled to said drive means for pulling said pivoted end of said actuating arm after a carrier has advanced to said stapling station.

11. In a machine for automatically filling and closing paper cartons with a top rib thereon, a horizontal conveyor having a plurality of spaced carton carriers fastened thereto, drive means for intermittently advancing said carriers to a stapling station along said conveyor, a stapling mechanism comprising a hammer and anvil disposed on opposite sides of the top rib location, a feeler member pivotally connected at one end to the face of the anvil, the free end of said feeler member being lifted to lie along a carton top rib upon the entry of a carrier containing a carton into the stapling station, an actuating arm pivoted at one end positioned transversely across said feeler member, hammer engaging means on said arm being elevated to operating position only when said feeler member is lifted, and timed means coupled to said drive means for pulling said pivoted end of said actuating arm after a carrier has advanced to said stapling station.

12. A machine for filling and closing paper cartons of a type having a top rib closure comprising a conveyor having elongated horizontal upper and lower support members supportingly spaced by first and second upright tubular supports, means for conveying a plurality of carton carriers from station to station around said support members, a stapler supported on the upper horizontal support member with hammer and anvil members disposed on opposite sides of a stapling station, an actuating arm pivotally connected at one end to a movable support on said upper horizontal support member and having its free end extending transversely across said stapling station, stapler hammer engaging means on said free end of said arm being operable only when a carton top rib is in said stapling station to lift said arm, a timed power drive system for intermittently advancing said conveyor, and means synchronized therewith to displace said movable support and pull said actuating arm when a carrier is at said stapling station.

References Cited in the file of this patent

UNITED STATES PATENTS

| | | | |
|---|---|---|---|
| 2,063,345 | Scott | Dec. 8, 1936 |
| 2,310,413 | Friden | Feb. 9, 1943 |
| 2,354,939 | Brock | Aug. 1, 1944 |
| 2,405,232 | Norquist | Aug. 6, 1946 |
| 2,434,952 | Norquist | Jan. 27, 1948 |
| 2,597,791 | Graham-Enock | May 20, 1952 |
| 2,611,473 | Reynolds | Sept. 23, 1952 |
| 2,621,841 | Simpson | Dec. 16, 1952 |